(12) United States Patent
Dunning

(10) Patent No.: US 9,447,839 B2
(45) Date of Patent: Sep. 20, 2016

(54) SUPPORT MODULE FOR LITHOGRAPHY SYSTEM

(71) Applicant: Mapper Lithography IP B.V., Delft (NL)

(72) Inventor: Alje Geert Dunning, Delft (NL)

(73) Assignee: MAPPER LITHOGRAPHY IP B.V., Delft (NL)

( * ) Notice: Subject to any disclaimer, the term of this patent is extended or adjusted under 35 U.S.C. 154(b) by 0 days.

(21) Appl. No.: 14/344,903

(22) PCT Filed: Sep. 17, 2012

(86) PCT No.: PCT/NL2012/050653
§ 371 (c)(1),
(2) Date: Mar. 13, 2014

(87) PCT Pub. No.: WO2013/039401
PCT Pub. Date: Mar. 21, 2013

(65) Prior Publication Data
US 2015/0014510 A1 Jan. 15, 2015

Related U.S. Application Data

(60) Provisional application No. 61/534,962, filed on Sep. 15, 2011.

(51) Int. Cl.
*F16M 13/00* (2006.01)
*F16F 15/073* (2006.01)
*F16F 3/02* (2006.01)

(52) U.S. Cl.
CPC ............. *F16F 15/073* (2013.01); *F16F 3/023* (2013.01); *F16F 3/026* (2013.01); *F16F 2228/063* (2013.01)

(58) Field of Classification Search
CPC .. F16F 15/037; F16F 2228/063; F16F 3/026; F16F 15/02; F16F 15/04; F16F 15/06
USPC ........ 248/571, 580, 581, 602, 603, 619, 620
See application file for complete search history.

(56) References Cited

U.S. PATENT DOCUMENTS 1,283,152 A * 10/1918 Gleeson et. al .............. 248/628
2,064,751 A * 12/1936 Carl ............................. 248/544

(Continued)

FOREIGN PATENT DOCUMENTS

| CN | 102506110 A | 6/2012 |
| CN | 102678804 A | 9/2012 |

(Continued)

OTHER PUBLICATIONS

Dunning, A.G. et al. "Review Article: Inventory of platforms towards the design of a statically balanced six degrees of freedom compliant precision stage", Faculty of Mechanical, Maritime and Materials Engineering, Department of Biomechanics Engineering, Delft University of Technology, Delft, The Netherlands, (2011), 12 pages.

(Continued)

*Primary Examiner* — Bradley Duckworth
(74) *Attorney, Agent, or Firm* — Blakely Sokoloff Taylor & Zafman LLP

(57) ABSTRACT

The invention relates to a support structure and support module, for instance for use in a lithography system, comprising a frame and a support for supporting a load, wherein said support is moveable relative to said frame, said support structure further comprising a force compensation spring assembly connecting said support to said frame for at least partially supporting said support and/or said load, wherein said force compensation spring assembly comprises a first spring having a negative stiffness characteristic over a predefined range of motion of said spring, and a second spring having a positive stiffness.

26 Claims, 3 Drawing Sheets

(56) References Cited

U.S. PATENT DOCUMENTS

| | | | |
|---|---|---|---|
| 2,932,482 A * | 4/1960 | Dickie | 248/619 |
| 3,592,422 A * | 7/1971 | Paine et al. | 248/589 |
| 3,727,865 A * | 4/1973 | Melrose et al. | 248/632 |
| 4,596,373 A * | 6/1986 | Omi et al. | 248/562 |
| 4,861,003 A | 8/1989 | Wolf et al. | |
| 4,958,812 A | 9/1990 | Wolf et al. | |
| 5,310,157 A | 5/1994 | Platus | |
| 5,370,352 A | 12/1994 | Platus | |
| 5,390,892 A | 2/1995 | Platus | |
| 5,570,286 A * | 10/1996 | Margolis et al. | 701/36 |
| 6,983,924 B2 * | 1/2006 | Howell et al. | 251/118 |
| 8,184,266 B2 | 5/2012 | Starreveld et al. | |
| 2010/0053589 A1 | 3/2010 | Hashemi | |
| 2011/0169516 A1 | 7/2011 | McFarland | |
| 2014/0123786 A1 * | 5/2014 | Hendershott | 74/69 |
| 2014/0190677 A1 * | 7/2014 | Platus et al. | 165/185 |

FOREIGN PATENT DOCUMENTS

| | | |
|---|---|---|
| EP | 0 811 899 A1 | 12/1997 |
| EP | 1513022 A1 | 3/2005 |
| EP | 1 847 771 A1 | 10/2007 |
| JP | 2000337439 A | 12/2000 |
| JP | 2004360742 A | 12/2004 |
| JP | 2005106272 A | 8/2006 |
| WO | WO-2010027100 A1 | 3/2010 |
| WO | WO-2011/074962 A2 | 6/2011 |

OTHER PUBLICATIONS

Hoetmer, Karin et al. "A Building Block Approach for the Design of Statically Balanced Compliant Mechanisms", Proceedings of the ASME 2009 International Design Engineering Technical Conferences & Computers and Information in Engineering Conference, San Diego, California, USA (Aug. 30-Sep. 2, 2009), 1-11.

Kashdan, Lia et al. "Design, Fabrication and Evaluation of Negative Stiffness Elements", Solid Freedom Fabrication Symposium 2009, Mechanical Engineering Department, University of Texas at Austin, Austin, TV 78712 (2009), 16 pages.

Morsch, Femke M. et al. "Design of a Generic Zero Stiffness Compliant Joint", Proceedings of the ASME 2010 International Design Engineering Technical Conferences & Computers and Information in Engineering Conference, Montreal, Quebec, Canada (Aug. 15-18, 2010), 1-9.

Tolou, Nima et al. "Statically Balanced Compliant Micro Mechanisms (SB-MEMS): Concepts and Simulation", Proceedings of the ASME 2010 International Design Engineering Technical Conferences & Computers and Information in Engineering Conference, Montreal, Quebec, Canada (Aug. 15-18, 2010), 1-8.

Ibrahim et al. "Recent advances in nonlinear passive vibration isolators", Journal of Sound & Vibration, London, UK, vol. 314, nr. 3-5; DOI: 10./1016/J.JSV.2008.01.014; figure 5, p. 371, p. 377-379.

Office Action in Japanese Application No. 2014-530621 dated Nov. 4, 2015, and English translation. 4 pages.

* cited by examiner

SUPPORT MODULE FOR LITHOGRAPHY SYSTEM

BACKGROUND

The invention relates to a support module for supporting a load, in particular for use in a lithography system, said support module comprising a force compensation spring for at least partially supporting said load. U.S. Pat. No. 5,310,157 describes an omnidirectional vibration-isolating suspension system for supporting an object in an equilibrium position relative to a base while suppressing transmission of vibratory motion between the object and the base, comprising: three composite suspension apparatuses connected between the object and the base, each of said suspension apparatuses comprising spring means adapted to provide positive stiffness in the axial direction and having force supporting capability in the axial direction for supporting the object; and means for producing negative stiffness operatively connected with said spring means wherein said spring means and said negative-stiffness-producing means combine to produce low axial stiffness of the second suspension device which is the algebraic sum of the positive and negative stiffness.

A drawback of the known system is that each of the three composite suspension apparatuses has to be calibrated in order to provide a well defined system.

It is an object of the present invention to provide a support module for supporting a target in a lithography system, said support module requiring less or no calibration after being placed within the system.

SUMMARY OF THE INVENTION

According to a first aspect, the invention provides a support module for supporting a load, such as a target to be patterned in a lithography system, said module comprising: a support for supporting said load, and three support structures, said support structures each comprising: a frame and a force compensation spring assembly connecting said support to said frame for at least partially supporting said support and/or said load, wherein said force compensation spring assembly comprises a first spring having a negative stiffness characteristic over a predefined range of motion of said spring, and a second spring having a positive stiffness; wherein said frames of each of said three support structures are substantially rigidly attached to each other, and in that said support is connected to said three force compensation spring assemblies to be moveable relative to said frames.

The support is connected to the frames via three separate spring assemblies, each of which can be compressed/expanded substantially individually, thus providing three degrees of freedom of motion of the support relative to the frame. Because the frames are rigidly connected to each other, there is no need to further align or calibrate the spring assemblies and/or frames relative to each other once the module is placed in a system such as a lithography system; maintenance, insertion and replacement of the support module is thus facilitated.

The three separate spring assemblies preferably have substantially parallel directions of compression/expansion. The entire support may thus be translated relative to the frame along said directions of compression/expansion, or alternatively, the orientation of the support relative to the frame may be changed by compressing or expanding one or two of said spring assemblies while the remaining spring assembly or assemblies compress or expand differently, or do not compress or expand at all.

Each support structure of the support module thus provides a total, non-zero, spring force over said range of motion, which spring force is the sum of the spring force of the first spring of the support structure and the spring force of the second spring of the support structure on the support. The range of motion is a subrange of a range of compression/expansion of the spring assembly. Moreover, as the spring assemblies of the module each have a total stiffness substantially equal to zero, at least along their direction of expansion or compression, propagation of vibrations from the frame to the support through the spring assembly is reduced.

Preferably the spring assemblies are configured to exert a spring force of a magnitude substantially equal to a force on the spring assembly exerted by the support and/or load thereon, such that the spring assemblies substantially completely support the support and/or load thereon. Preferably, the support comprises a platform for carrying said load thereon, wherein preferably the force exerted by said load on the platform is directed substantially vertically, e.g. when the force exerted by said load on the platform is substantially due to gravity. As the positive stiffness springs and negative stiffness springs are passive elements, construction of a compact support structure with a substantially constant spring force over a range of movement may be achieved.

In an embodiment said frames together define a triangular prism-shaped volume, wherein said force compensation spring assemblies are arranged substantially at different outer sides of said triangular prism-shaped volume and have substantially parallel directions of compression/extension substantially along center lines of said sides. Thus, the support and three support structures together define an inner volume, within which for instance an actuator for actuating the position of the support may be placed. Preferably, both the positive springs and their associated negative springs are arranged at an outer side of the prism and adapted for bending, or compressing/expanding, substantially only in a plane parallel to said outer side, such that each of the spring assemblies is substantially free from torsion around their direction of expansion/compression.

In an embodiment each frame of a support structure of said three support structures comprises a center section and two leg-sections arranged on either side of said center section and extending substantially perpendicular to said center section, wherein said first spring is connected on either side to a respective leg-section and spaced apart from said center section, and wherein said second spring is connected to said center section and spaced apart from said leg-sections, or vice versa. The leg-sections are spaced apart from the support such that the support is connected to the frame only via the spring assemblies. This embodiment allows a compact construction of the module according to the invention, capable of providing a relatively large spring force.

In an embodiment the support module further comprises a base and a flexible mount, wherein said flexible mount connects said base to each of said frames, and wherein said flexible mount is adapted for allowing movement of said frame relative to said base in a plane parallel to said base. Thus, the flexible mount is adapted for substantially preventing propagation of vibrations along the XY-plane from the base to the support, and the three support structures substantially are adapted to substantially prevent propagation of vibrations from the base to the support along the a direction normal to the base, e.g. the Z-direction.

In an embodiment said flexible mount comprises flexible struts extending substantially normal to said base.

In an embodiment the leg-sections of said frames comprise an accommodation space for at least partially accommodating said a strut of flexible struts therein along a substantial part of the length of said leg sections, wherein said strut is substantially free to flex in said accommodation space. Thus an increase in the possible range of translation of the frames relative to the base along XY is achieved, without requiring an increase the dimensions of the module along the length of the flexible struts.

In an embodiment said first spring and said second spring of each support structure are arranged for moving in a common plane, preferably along a common substantially straight line. The sum spring force of the spring assemblies may thus easily be calculated.

In an embodiment said first springs each comprise a bi-stable buckling beam. Bi-stable buckling beams have a negative stiffness between their two stable states, i.e. at least for a certain compression range between the two stable states, the spring force of each first spring diminishes the more the spring is compressed. For providing a desired spring force, each support structure may comprise a plurality of such buckling beams in parallel. In a preferred embodiment, neighboring buckling beams have similar V shapes, said neighboring beams extending substantially parallel to each other. In an alternative embodiment neighboring buckling beams have different V shapes such that two neighboring buckling beams together form two wedge shapes.

In an embodiment said second springs each comprise one or more leaf springs. Preferably the second springs comprise V-shaped leaf springs connected at one distal end to the frame and at another distal end to the first spring of the associated support structure. Such leaf springs do not introduce rotation along their direction of compression/extension at their points of connection with the frame and/or the first spring. Rotation of the support relative to the frames due to compression/expansion of the second spring is thus substantially avoided. For providing an increased spring force, the second springs may be provided with multiple leaf springs.

In an embodiment said leaf-springs of said second springs are arranged in a diamond configuration. Preferably the leaf-springs of said second springs are in a nested diamond configuration, with each leaf springs having a same length and/or a same spring characteristic. It is thus possible to provide a relatively large positive spring force within a relatively small amount of space.

In an embodiment said second spring comprises four corner sections, connecting said leaf springs such that said leaf springs in each quadrant of said diamond shape are arranged for moving substantially in parallel. One of said four corner sections preferably coincides with a center section (or center point) of said first spring connected to the support, and another, opposite corner section of said four corner section preferably coincides with a center section connecting said second spring to its corresponding frame.

In an embodiment, in each support structure, said first spring and said second spring are attached to each other, preferably at a center point of said first spring.

In an embodiment said support structure further comprises a plurality of motors adapted for positioning said support relative to said frame, said plurality of motors preferably comprising electro motors such as Lorentz motors. Displacement of the support and load relative to the frame may be effected by the electro motors. As the support structure substantially supports the support and the load, the electro motors have to do less work during said displacement. Moreover, when the support retains its position relative to the frame, the motors do not have to counteract a force exerted by the spring, reducing the amount of heat generated by the motors.

In an embodiment said support is fixedly and rigidly attached to the spring assembly. The support is thus directly and substantially supported by the spring assembly. Preferably the support is completely spaced apart from said frame.

In an embodiment said support is connected to said spring assembly via a joint or flexure, preferably via a frictionless ball joint. Some rotation of the support relative to the spring assembly is thus possible. This is especially advantageous when the support structure comprises multiple such spring assemblies connecting the support to the frame, so that an orientation of the support may changed without moving all of said spring assemblies in tandem.

In an embodiment said flexible struts are adapted to be biased by the load exerted thereon by the frame and/or said load, such that said struts have substantially no stiffness a plane parallel to said base. As the load exerted on the struts is typically predetermined and substantially constant, the struts can be dimensioned such that they flex slightly, preferably in an S-shape, when the load is applied thereto.

In an embodiment said support is provided with six degrees of freedom relative to said base. For instance, the flexible struts may allow translation of the support relative to the base along in the XY plane and rotation around the Z-axis, whereas the spring assemblies allow rotation around Rx and Ry, as well as translation along the Z-axis.

According to a second aspect, the present invention provides a support structure comprising a frame and a support for supporting a load, wherein said support is moveable relative to said frame, said support structure further comprising a force compensation spring assembly connecting said support to said frame for at least partially supporting said support and/or said load, wherein said force compensation spring assembly comprises a first spring having a negative stiffness characteristic over a predefined range of motion of said spring, and a second spring having a positive stiffness, wherein said first spring comprises one or more bi-stable buckling beams, wherein said second spring comprises one or more leaf springs, wherein said buckling beams and said leaf springs are arranged for moving and/or bending in a substantially common plane. The support structure, which may be used as in a support module as described above, provides a spring assembly having a stiffness substantially equal to zero, within the predefined range of motion, and capable of providing a relatively large spring force while taking up a relatively small volume.

In an embodiment the leaf springs are arranged in a first, second, third and fourth set of leaf springs, wherein leaf springs of the first set are connected at a first end to a first corner section and at an opposite second end to a second corner section, wherein leaf springs of the second set are connected at a first end to said first corner section and at an opposite second end to a third corner section, wherein leaf springs of said third set are connected at a first end to a fourth corner section and at an opposite second end to said second corner section, wherein leaf springs of said fourth set are connected at a first end to said fourth corner section and at an opposite second end to said third corner section, wherein said first, second and third corner sections are adapted to move in parallel directions relative to said frame. Preferably, during expansion and/or compression of the second spring, the leaf springs of said first and third set remain substantially parallel, and the leaf springs of said second and fourth set remain substantially parallel.

Preferably, each of the corner sections comprises a surface which extends substantially along the direction of compression/expansion of its corresponding spring assembly, with each of the leaf springs connected to said surface spaced apart along said direction of expansion/compression.

In an embodiment said fourth corner section is rigidly attached to said frame.

In an embodiment said first corner section is connected to said first spring. Preferably, the first and fourth corner sections are arranged along a line which coincides with the direction of expansion or compression of the spring assembly associated with said frame.

The spring assembly is preferably manufactured as a monolithic block, e.g. comprising a metal such as titanium, iron and/or aluminum. Such a monolithic block may for instance be manufactured by casting, or using a 3D printer.

In an embodiment said leaf springs all have a substantially equal length and/or substantially equal spring characteristics. There is thus no need to calibrate the leaf springs, e.g. the force exerted thereby, with respect to one another.

In an embodiment each set of leaf springs comprises at least two leaf springs, wherein said leaf springs within each set are substantially parallel to each other. By providing each set with multiple leaf springs, a stronger total spring force is achieved.

In an embodiment said leaf springs are arranged in nested substantially diamond shaped configurations. By nesting the leaf springs in diamond shaped configurations a stronger total spring force is achieved. The nested diamond-shaped configurations are preferably arranged to remain substantially congruent during expansion or compression of the second spring.

According to a third aspect the present invention provides a lithography system comprising a support module and/or support structure as described herein.

In an embodiment said lithography system further comprises a vacuum chamber, wherein said support module is arranged within said vacuum chamber. The support module is adapted for supporting a load in different positions, substantially without generating heat, which is especially advantageous in a vacuum environment In an embodiment said lithography system further comprises a positioning system adapted for positioning said support module within said lithography system. Such a positioning system for instance comprises an x-stage and/or a y-stage for moving the support module within the lithography system. Preferably the lithography system and/or the support module comprises actuators for positioning the support relative to the frame. A load supported by the support module may thus be accurately positioned within the lithography system.

In an embodiment said lithography system further comprises an optical column adapted for projecting one or more beams onto a target such as a wafer, wherein said support module is adapted for supporting said target substantially aligned with said optical column.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached drawings, in which.

DETAILED DESCRIPTION OF THE INVENTION

Figure 1:
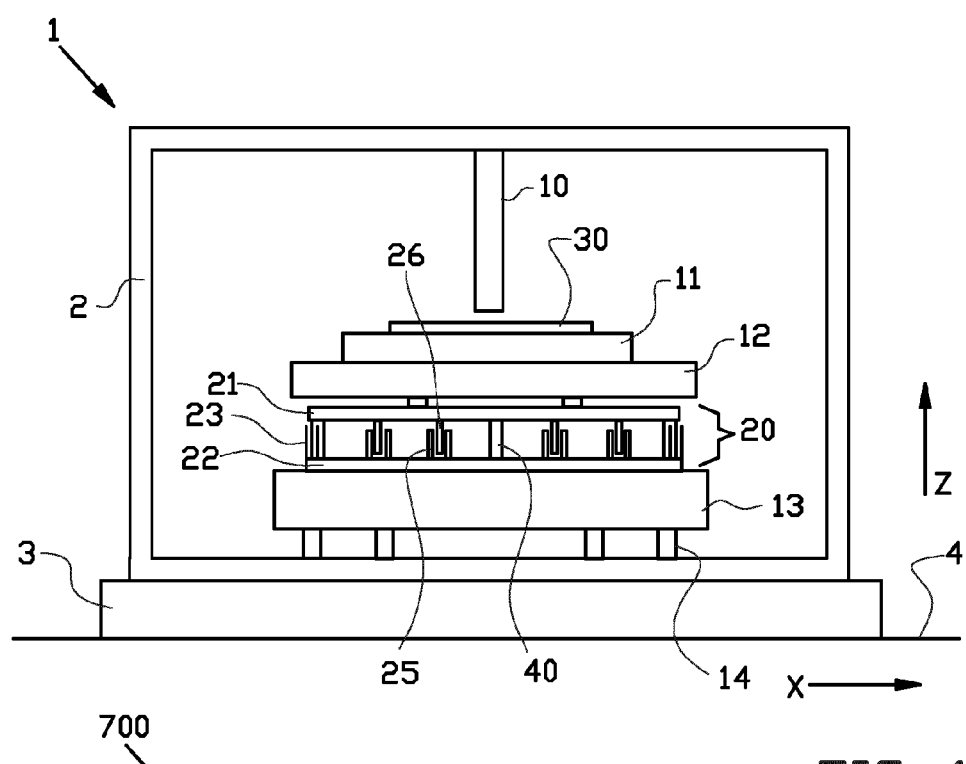
FIG. 1A shows a prior art lithography system comprising a gravity compensation spring.
FIG. 1B shows a lithography system comprising a support module according to the present invention, FIGS. 2A and 2B each show an isometric view of a different support module of the present invention.

FIG. 1A schematically shows a prior art lithography system 1 comprising a vacuum chamber 2 mounted on a concrete slab 3. Due to its mass, the concrete slab 3 at least partially isolates the vacuum chamber 2 from high frequency vibrations from floor 4. The maskless lithography system 1 comprises an optical column 10, adapted for projecting a plurality of charged particle beams onto a target 30, in this case a wafer. The target 30 is supported on a wafer table 11, which in turn is supported on a chuck 12. The wafer table 11 is typically detachably attached to the chuck 12, to enable effective transfer of the target 30, for instance for moving the target 30 out of the vacuum chamber 2 to another processing system. The chuck 12 is supported by a fine motion stage 20, adapted for positioning said chuck 12 in six degrees of freedom, i.e. for providing fine displacement of the chuck 12 relative to XY-stage 13. The XY-stage 13 is mounted to the vacuum chamber 2 by means of supporting pillars 14, and is adapted for displacing the fine motion stage 20 and anything supported thereby, within an XY plane which extends substantially parallel to direction X and normal to directions Z and X.

The fine motion stage 20 comprises a first member 21, and a second member 22 which is moveable with respect to said first member 21. The fine motion stage 20 comprises a number of electro motors, in this case Lorentz-motors 25, 26, for adjusting the position the first member relative to the second member in six degrees of freedom, wherein adjustment is typically in the micrometer and/or micro radian range. The fine motion stage may thus for instance be used to adjust the distance along the Z axis between the target 30 and the optical column 10, e.g. by 10 micrometer. To shield the rest of the interior of the vacuum chamber 2 against electromagnetic radiation generated by the electro motors 25, 26, a metallic shielding 23 is provided. The shielding 23 extends along the edges of the first and second members and substantially completely encloses the interior of the fine motion stage 20. To reduce the load on the electro motors 25, the fine motion stage 20 is provided with a gravity compensation spring 40, which partially supports the weight of the first member 21, the chuck 12, wafer table 11 and target 30. However, due to the stiffness of the spring 40, the spring passes on vibrations from the second member to the first member, and thus from XY-stage to the chuck 12. Moreover, even when the first member remains in place relative to the second member, the electro motors must substantially continuously be powered to counteract any spring action of the spring 40 on the first and second members, generating excessive amounts of heat.

Each, of the support structures is preferably devised as a single piece, or alternatively, by a number of mutually and spatially well defined parts, which at least do not have moving contact, i.e. wherein the contact between the first spring, the second spring, the frame and the support is fixed.

FIG. 1B shows a lithography system, in which like reference numbers refer to like structures as in FIG. 1A. In the lithography system shown in FIG. 1B, instead of a gravity compensation spring 40, a support module 400 according to the present invention is provided.

Figure 2A:
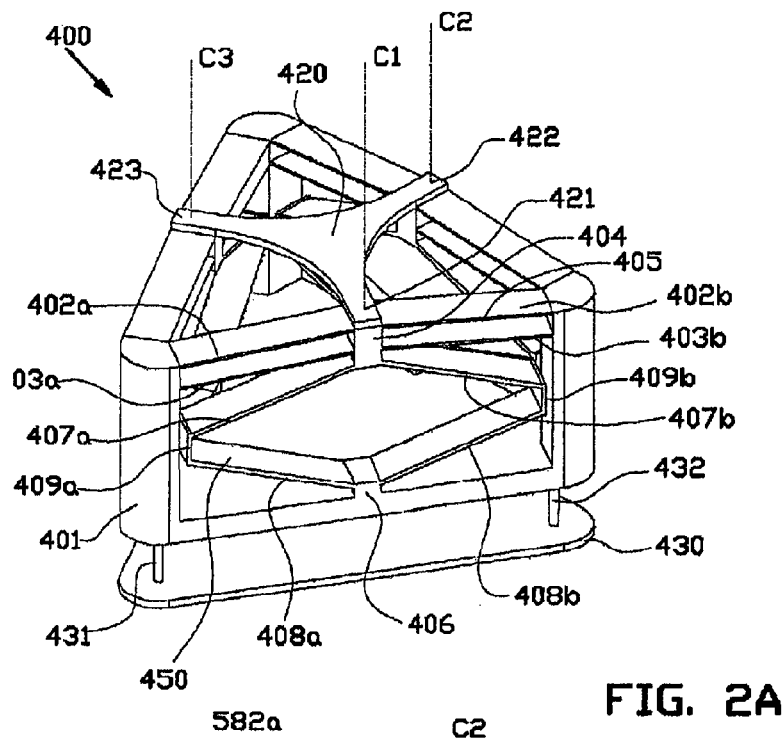

FIG. 2A shows an isometric view of an embodiment of a support module 400 according to the present invention. The support module comprises a substantially rigid frame 401, defining a prism-shaped volume. The support module comprises a frame 401 flexibly mounted on a triangular base 430 via flexible struts 431,432 which extend normal from said base 430. Though only the front facing 431,432 struts are visible, the support module comprises three struts, each strut located at a corresponding corner of the base 430.

A first spring 405 having a negative stiffness is connected to the frame 401. Though the first spring shown comprises two bi-stable buckling beams comprising buckling beam sections 402a,402b and 403a,403b respectively, any number of such buckling beams may be used to provide a desired spring force of the first spring. At point 406 a second spring 450 comprising bars 407a,407b,408a,408b and flexible elastic corner sections 409a,409b is connected to the frame 401. The second spring 450 is connected to the first spring 405 at the center 404 of said first spring 405. The first and second spring together form a first spring assembly, advantageously constructed without moving contact between said first and second spring.

The support module 400 further comprises a second such spring assembly and a third such spring assembly on the other sides of the prism-shaped support module 400, said spring assemblies having substantially parallel directions of compression/extension C1,C2,C3. The support module comprises a support 420, connected to said three spring assemblies, and is moveable relative to the rigid frame 401 by compressing/expanding at least one of said spring assemblies. Thus the three spring assemblies together allow displacement of the support relative to the frame in three degrees of freedom, i.e. translation along the Z axis, rotation of the support relative to the frame along the X- and Y-axes. Though in the embodiment shown the support 420 is rigidly connected to the three spring assemblies at points 421,422 and 423, in an alternative embodiment the support may be connected to said points via a flexible joint, for instance via a ball joint or a substantially frictionless ball joint. The support module thus provides three degrees of freedom of movement of the support 420 relative to the frame 401.

To provide additional degrees of freedom for the support 420 relative to the base 430, the frame 401 is flexibly mounted on the base via flexible struts 431,432 and 433 (the latter not shown), which allow some movement of the frame relative to the base along the XY plane, and further allow some rotation of the frame relative to the base around the Z-axis. The struts 431,433 and 433 are adapted to be biased by the load exerted thereon by the frame and load supported thereby, such that they that they have substantially no stiffness in the XY-plane when flexing, i.e. the struts are loaded such that they are at the point of buckling. At this point when neither completely buckling or bending, the struts effectively have zero stiffness for translations in the XY plane and rotations around the Z axis. The support module 400 thus provides six degrees of freedom for the support 420 relative to its base 430. Moreover, the struts 431,432,433 and spring assemblies substantially isolate the support 420 from vibrations of the base 430 due to the zero stiffness nature of the struts at the moment of buckling and the zero-stiffness spring assembly.

The frame 401 functions as single a frame for three support structures which support structures each comprise a force compensation spring assembly as described herein.

The support module of this embodiment may be used in an existing lithography system without adaptation of the existing lithography system and provides a relatively large support force in a small volume. To prevent undesired translation of the support relative to the base in a plane different from the XY plane, the support module is preferably arranged in a system, such as a lithography system, in an upright position, i.e. with its base 430 on a substantially horizontal surface such as the surface of a stage for XY-movement of the target. When the support module 400 is arranged in this manner the flexible mount 431,432 substantially suppresses propagation of vibration from the base 430 to the support 420 along the XY plane independent of rotation of the support 420 around Rx or Ry relative to the base 430, and the spring assemblies of the three support structures substantially suppress propagation of vibrations from the base 430 to the support 420 along the Z-axis.

Figure 2B:
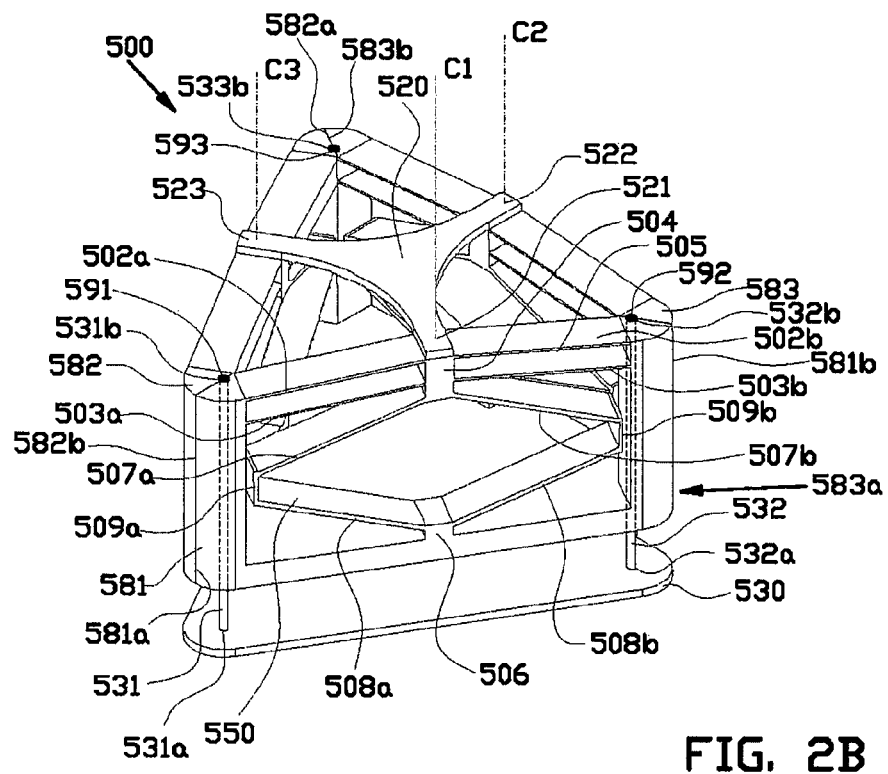

FIG. 2B shows an alternative embodiment of a support module 500 according to the invention, comprising three support structures having frames 581, 582 and 583 respectively. The frames each substantially have a U-shape, with a center section extending substantially parallel to a base 530, and with leg-sections which extend substantially normal to the base 530. The frames 581, 582, 583 are fixedly attached to each other such that leg-sections 581a and 582b, 582a and 583b, and 583a and 581b thereof respectively abut. During manufacture of the module 500, the support 520 is preferably attached to points 521, 522 and 523 once the frames 581, 582 and 583 have been fixed to each other. Reference numerals 521, 522, 523 substantially correspond to reference numerals 421, 422, 423 of FIG. 2A.

Between the leg-sections of each frame 581, 582, 583 a force-compensation spring assembly is provided. E.g., the first support structure comprising the first frame 581 further comprises a first spring 505 with buckling beam sections 502a, 502b, 503a, 503b, and a second spring 550, comprising bars 507a, 508b, 508a, 508 and corner sections 509a, 509b, wherein the force-compensation spring assembly is substantially completely arranged within a plane spanned by leg sections 581a, 581b of first frame 581 and is adapted for compressing and/or expanding substantially only within said plane.

The corner sections 509a,509b of the second spring 550 are preferably flexibly elastic, in particular when the bars 507a,507b,508a,508b are substantially rigid, but may alternatively be substantially rigid when the bars 507a,507b, 508a,508b connected therewith are flexibly elastic. The bars of the second spring 550 are arranged in a diamond shaped configuration. Each leg-section of the frames 581,582,583 comprises an accommodation section for accommodating a flexible strut (or flexure) 531,532,533 along a substantial portion of the length of the leg-section. For instance, flexible strut 531 is attached at one end 531a to the base 530, extends through substantially hollow accommodation sections in the abutting leg-sections 581a,582b of frames 581 and 582, and is attached with its other end 531b proximate to a top portion of said leg-sections at point 591. The flexible strut 531 which extends through a substantial portion of the leg-sections 581a,582b while spaced apart therefrom, allows substantially more translation of the frames 581,582,583 along the XY-plane than a shorter flexible strut which does not extend through the leg-sections would. The other flexible struts 532 and 533 are attached in a similar fashion, i.e. are attached at one end 532a,533a to the base 530 and at another end 532,532b, proximate to points 592 and 593 respectively. Thus, a compact module is provided allowing relatively large translations of the frames 581,582,583 relative to the base 530 along the XY plane.

Figure 3:
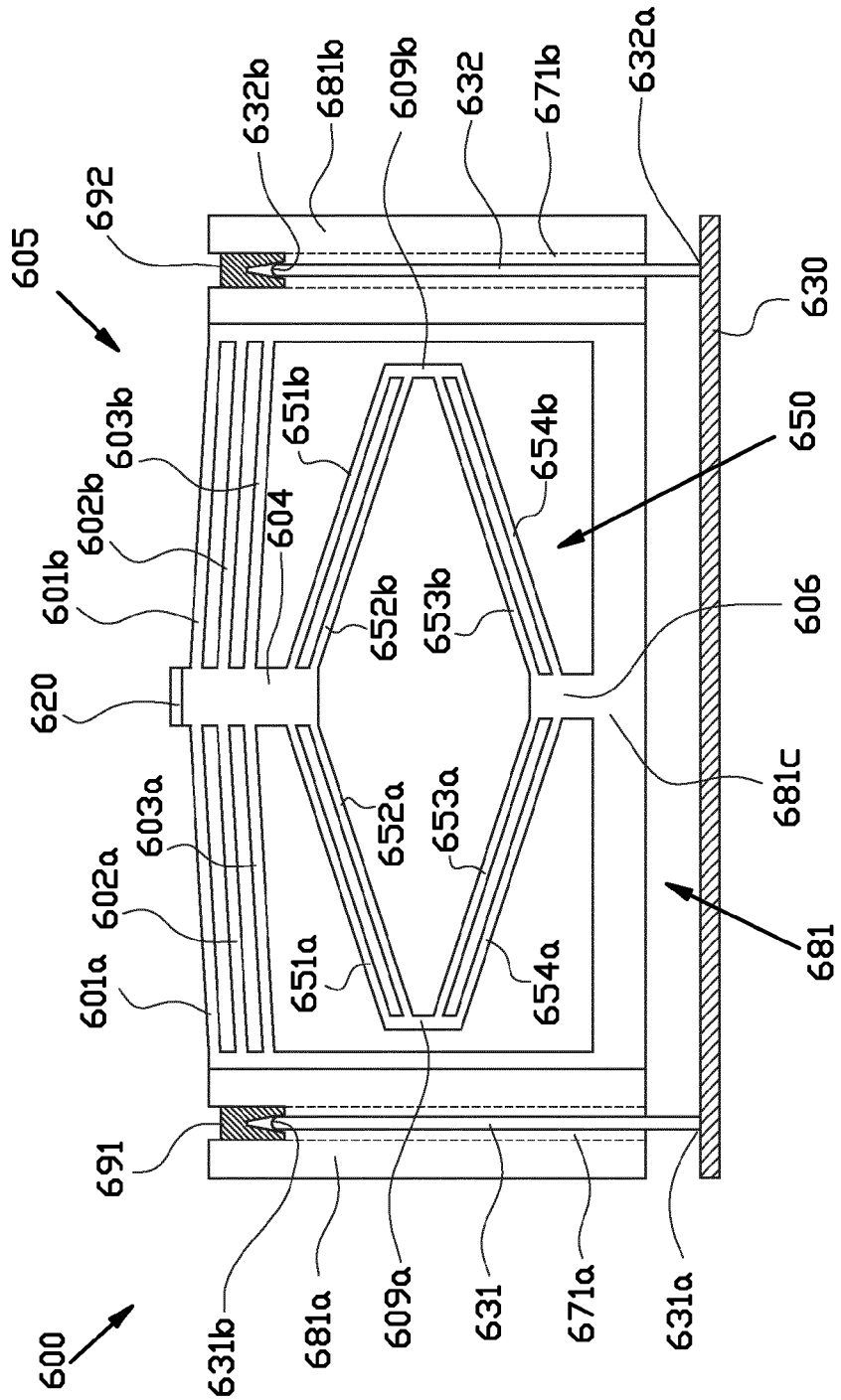
FIG. 3 shows a cross-sectional view of a support structure as used in a support module according to the present invention.

FIG. 3 shows a cross-sectional view of a support structure 600 according to the present invention and as may be used in a module according to the invention. The support structure 600 comprises a frame 681, comprising a two leg-sections 681a,681b arranged on either side of a center section 681c. The center section 681c extends substantially parallel to a base 630, while the leg-sections 681a,681b extend substantially perpendicular to the center section and parallel to each other. A first spring 605, having a negative spring characteristic, and a second spring 650 having a positive spring characteristic, extend between the two leg-sections 681a,681b. The first spring comprises elastic beams 601a,602a,603a connected at one end to leg 681a of the frame 681, and at another end to a first corner section, or center portion, 604 of the first spring 605. Corresponding elastic beams 601b,602b,603b are connected at one end to said first corner section 604 and at another end to leg 681b of frame 681. The second spring 650 comprises elastic beams 651a,651b,652a,652b,653a,653b,654a,654b arranged in a nested diamond shaped configuration. Though only two "nestings" are shown, the second spring may have a greater number of nestings thanks to second and third corner sections 609a,609b which connect the upper beams 651a,651b,652a,652b and lower beams 653a,653b,654a, 654b with each other. The beams in the nestings preferably all have the same spring characteristics, though in alternative embodiments the beams of the second spring may have different spring characteristics. The beams in each quadrant of the diamond are arranged substantially parallel.

First corner section 604 connects the first spring 605 with the second spring, and also connects the first spring 605 with the support 620. Fourth corner section 606 connects the second spring 650 with the center section 681c of frame 681. The corner sections 604 and 606 thus allow parallel movement of the beams connected thereto in a similar manner as corner sections 609a,609b.

The frame 681 is supported on the base 630 via flexible and elastic struts 631,632. The struts 631,632 are fixed with the first ends 631a,632a to the base 630, extend through respective accommodation sections 671a,671b of the leg-sections 681a,681b, and are attached proximate to the top of said leg-sections 681a,681b within a conical section of screws 691,692. Thus, the flexible struts 631,632 are substantially free to bend along the length of the leg-sections 681a,681b. The screws 691,692 comprise an outer thread which fits with an inner thread of the ends of the leg-sections 681a,681b. By turning the screws 691,692, the position of the point of attachment of the flexible struts 631,632 to the frame 681 along the Z-direction may be somewhat adjusted.

Figure 4:
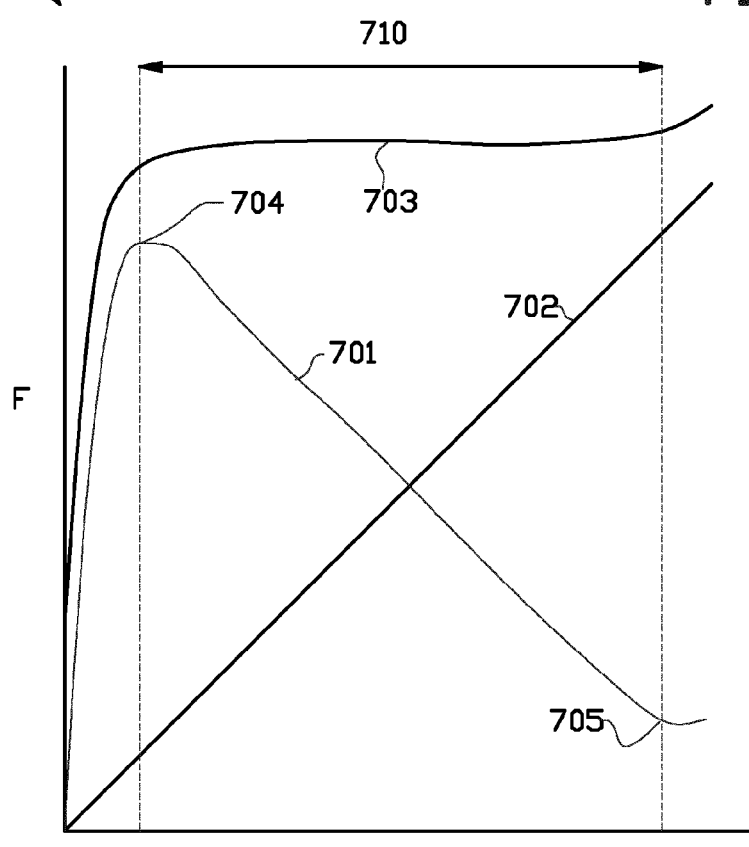
FIG. 4 shows a graph of displacement of springs of the spring assembly as used in an embodiment of the present invention versus the force exerted by said springs, and a sum of said forces.

FIG. 4 shows a graph 700 of spring force vs. compression for the first and second springs of a spring assembly as used in the present invention, and line 703 representing the sum of the spring forces. Line 701 represents the spring force vs. displacement of the first spring, which has a negative stiffness between within range 710 defined by points 704 and 705, i.e. the force exerted by the spring diminishes as the spring is compressed within the range 710. Line 702 represents the spring force vs. compression characteristics of the second spring, which has a positive stiffness, i.e. for which the spring force exerted by the spring increases substantially proportionally when the second spring is compressed. Within the range 710, the sum spring force exerted by the spring assembly remains substantially constant. For instance, when the range 710 comprises 4 mm of compression of the spring assembly and the sum spring force within said range 710 is substantially equal to 240 N, then the spring assembly can be used to counteract a 240 N force over said range, e.g. for counteracting a force of 240 N due to gravity of a target, wafer table, chuck and support together having a mass of 24 kg. As the spring force is substantially constant and preferably equal to the force exerted by the load, any actuators used for positioning the load only have to do work for said positioning, i.e. during movement of the load, and substantially do not have to do work to counteract the spring force when the load is not being displaced, reducing the power required by the actuators and reducing heat output.

In summary, the invention relates to a support structure and support module, for instance for use in a lithography system, comprising a frame and a support for supporting a load, wherein said support is moveable relative to said frame, said support structure further comprising a force compensation spring assembly connecting said support to said frame for at least partially supporting said support and/or said load, wherein said force compensation spring assembly comprises a first spring having a negative stiffness characteristic over a predefined range of motion of said spring, and a second spring having a positive stiffness. The invention further relates to a lithography system comprising such a support structure or support module.

It is to be understood that the above description is included to illustrate the operation of the preferred embodiments and is not meant to limit the scope of the invention. In particular, a support structure as described herein may be used for supporting a mass thereon, and/or for supporting a mass suspended there from. Also, the support structure according to the invention may provide support forces in other directions than the vertical direction as described, in particular including horizontal directions. In this manner, the invention may also be applied for general supporting of loading on a structure in other fields of technology besides lithography. From the above discussion, many variations will be apparent to one skilled in the art that would yet be encompassed by the spirit and scope of the present invention.

The invention claimed is:

1. Support module (400; 500) for supporting a load, said module comprising
a support (420; 520) for supporting said load,
three support structures, said support structures each comprising:
    a frame comprising a center section and two leg-sections arranged on either side of said center section and extending substantially perpendicular to said center section,
    a force compensation spring assembly connecting said support to said frame for at least partially supporting said support and/or said load,
wherein said force compensation spring assembly comprises
    a first spring having a negative stiffness characteristic over a predefined range of motion of said spring, and
    a second spring having a positive stiffness,
wherein said three support structures are arranged with said frames of each of said three support structures being substantially rigidly attached to each other, and wherein said support is connected to each of said three force compensation spring assemblies to be moveable relative to said frames, wherein said module further comprises:

a base (430; 530; 630); and a flexible mount comprising flexible struts (431,432,433; 531,532,533; 631,632) which extend substantially normal to said base, wherein said flexible mount connects said base to each of said frames and is adapted for allowing movement of said frame relative to said base in a plane parallel to said base (430; 530; 630);

wherein said leg sections (581a,581b; 681a,681b) of said frames comprise an accommodation space (671a,671b) for at least partially accommodating a strut (531,532; 631,632) of said flexible struts therein along a part of the length of said leg-sections, wherein said strut is substantially free to flex in said accommodation space.

2. Support module according to claim 1, wherein said frames together define a triangular prism-shaped volume, wherein said force compensation spring assemblies are arranged substantially at different outer sides of said triangular prism-shaped volume and have substantially parallel directions of compression/extension substantially along center lines (C1,C2,C3) of said sides.

3. Support module according to claim 1, wherein, in each frame of a support structure of said three support structures, said first spring is connected on either side to a respective leg-section and spaced apart from said center section, and wherein said second spring is connected to said center section and spaced apart from said leg-sections.

4. Support module according to claim 1, wherein each second spring of each said support structure is arranged between two of said flexible struts (531, 532, 533; 631, 632, 633), each strut having a first distal end (531a, 532a, 533a; 631a, 632a, 633a) and an opposite second distal end (531b, 532b, 533b; 631b, 632b, 633b), such that each second spring is arranged between a plane intersecting the first distal ends of said two flexible struts and a plane intersecting said second distal ends of said two flexible struts.

5. Support module according to claim 1, wherein said first springs each comprise one or more bi-stable buckling beams having a negative stiffness between two stable states.

6. Support module according to claim 1, wherein said second springs each comprise one or more leaf springs.

7. Support module according to claim 6, wherein said leaf-springs of each second spring are arranged in a diamond shaped configuration.

8. Support module according to claim 7, wherein each second spring comprises four corner sections (405,406, 409a,409b; 505,506,509a,509b; 604,606,609a,609b) connecting said leaf springs such that said leaf springs in diagonally opposite quadrants of said diamond shape are arranged for remaining substantially parallel during expansion or compression of said second spring.

9. Support module according to claim 1, wherein in each support structure said first spring and said second spring are attached to each other at a center point of said first spring.

10. Support module according to claim 1, wherein said support structures are monolithic support structures and/or wherein said module is formed as a monolithic structure.

11. Support module according to claim 1, wherein said first spring and said second spring of each support structure are arranged for moving in a common plane, along a common substantially straight line (C1,C2,C3).

12. Lithography system (1) comprising a support module (400;500) according to claim 1, wherein said load comprises a target to be patterned in said lithography system.

13. Lithography system according to claim 12, further comprising a vacuum chamber (2), wherein said support module (400;500) or said support structure is disposed within said vacuum chamber.

14. Lithography system according to claim 12, further comprising an optical column (10) adapted for projecting one or more beams onto a target, wherein said support module or said support structure is adapted for supporting said target substantially aligned with said optical column.

15. Lithography system according to claim 12, further comprising a positioning system (13,20) adapted for positioning said support module or said support structure within said lithography system.

16. Lithography system according to claim 12, wherein said lithography system comprises actuators for positioning the support of said support module relative to the frame of said support module.

17. Lithography system (1) according to claim 12, further comprising a plurality of motors (25, 26) adapted for positioning said support relative to said frame.

18. Support structure comprising:

a frame comprising a center section and two leg-sections arranged on either side of said center section and extending substantially perpendicular to said center section, and a support for supporting a load, wherein said support is moveable relative to said frame, said support structure further comprising a force compensation spring assembly connecting said support to said frame for at least partially supporting said support and/or said load, by at least partially supporting the weight of said support and/or said load, wherein said force compensation spring assembly comprises:

a first spring having a negative stiffness characteristic over a predefined range of motion of said spring, and a second spring having a positive stiffness, and wherein said support structure further comprises:

a base; and a flexible mount comprising two flexible struts which extend substantially normal to said base, wherein said flexible mount connects said base to said frame and is adapted for allowing movement of said frame relative to said base in a plane parallel to said base, and wherein said leg sections of said frame comprise an accommodation space for at least partially accommodating a strut of said flexible struts therein along a part of the length of said leg-sections, wherein said strut is substantially free to flex in said accommodation space.

19. Support structure according to claim 18, wherein each of said two flexible struts has a first distal end and an opposite distal second end, and wherein said second spring is at least partially arranged between a plane intersecting said first distal ends and a plane intersecting said second distal ends.

20. Support structure according to claim 18, wherein said first spring is connected on either side to a respective leg-section and spaced apart from said center section, and wherein said second spring is arranged between said two leg-sections and is connected to both said first spring and to said center section, wherein said second spring is spaced apart from said leg-sections.

21. Support structure according to claim 18, wherein said first spring comprises one or more bi-stable buckling beams having a negative stiffness between two stable states, wherein said second spring comprises one or more leaf springs, wherein said buckling beams and said leaf springs are arranged for moving and/or bending in a substantially common plane,
    wherein said leaf springs are arranged in a first, second, third and fourth set of leaf springs, each of said sets of leaf springs comprising at least two leaf springs, wherein said leaf springs within each set are substantially parallel to each other,
    wherein said leaf springs of the first set are connected at a first end to a first corner section and at an opposite second end to a second corner section, wherein said leaf springs of the second set are connected at a first end to said first corner section and at an opposite second end to a third corner section, wherein said leaf springs of said third set are connected at a first end to a fourth corner section and at an opposite second end to said second corner section,
    wherein said leaf springs of said fourth set are connected at a first end to said fourth corner section and at an opposite second end to said third corner section, wherein said first, second and third corner sections are adapted to move in parallel directions relative to said frame.

22. Support structure according to claim 21, wherein said fourth corner section is rigidly attached to said frame.

23. Support structure according to claim 22, wherein said first corner section is connected to said first spring.

24. Support structure according to claim 21, wherein said leaf springs all have a substantially equal length and/or substantially equal spring characteristics.

25. Support structure according to claim 21 wherein said leaf springs are arranged in nested substantially diamond shaped configurations.

26. Lithography system (1) comprising a support structure according to claim 18.

* * * * *